United States Patent
Ninagawa

(10) Patent No.: US 10,712,926 B2
(45) Date of Patent: Jul. 14, 2020

(54) DISPLAY INPUT DEVICE, IMAGE FORMING APPARATUS, AND CONTROL METHOD FOR DISPLAY INPUT DEVICE

(71) Applicant: KYOCERA Document Solutions Inc., Osaka (JP)

(72) Inventor: Takayasu Ninagawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/423,945

(22) Filed: May 28, 2019

(65) Prior Publication Data

US 2019/0391717 A1    Dec. 26, 2019

(30) Foreign Application Priority Data

Jun. 22, 2018    (JP) ................................. 2018-119101

(51) Int. Cl.
*G06F 3/0485*    (2013.01)
*H04N 1/00*    (2006.01)
*G06F 3/0488*    (2013.01)

(52) U.S. Cl.
CPC ........ *G06F 3/0485* (2013.01); *G06F 3/04883* (2013.01); *H04N 1/00411* (2013.01)

(58) Field of Classification Search
CPC ............... G06F 3/0485; G06F 3/04883; G06F 3/04847; H04N 1/00411

USPC ......................................................... 345/173
See application file for complete search history.

(56) References Cited

U.S. PATENT DOCUMENTS

| | | | |
|---|---|---|---|
| 2007/0152979 A1 | 7/2007 | Jobs | G06F 3/0236 345/173 |
| 2009/0002324 A1 | 1/2009 | Harbeson | G06F 3/0485 345/173 |
| 2013/0335341 A1 | 12/2013 | Ishibashi | G06F 3/04883 345/173 |
| 2015/0033181 A1 | 1/2015 | Mizunuma | G06F 1/169 715/784 |
| 2017/0139556 A1 | 5/2017 | Josephson | H04L 67/12 |
| 2017/0220239 A1 | 8/2017 | Smith | G06F 3/04886 |
| 2017/0285899 A1 | 10/2017 | Ishikawa | |

FOREIGN PATENT DOCUMENTS

JP    2017-182497 A    10/2017

*Primary Examiner* — Mark Edwards
(74) *Attorney, Agent, or Firm* — Stein IP, LLC

(57) ABSTRACT

A display input device includes a touch screen and a control unit. When the control unit determines that a scroll operation is performed, it controls the touch screen to start scroll processing to scroll display content on the screen. After the control unit controls the touch screen to start the scroll processing, when it determines that an adjust operation is performed on the touch screen in which a contact body is moved while keeping contact with the touch screen, it changes scroll speed of the scroll processing by the touch screen in accordance with a contact position of the contact body performing the adjust operation on the touch screen.

9 Claims, 7 Drawing Sheets

START TIME POINT OF ADJUST OPERATION

MOVE SECOND CONTACT BODY TO UPPER SIDE
↓
INCREASE SCROLL SPEED

FURTHER MOVE SECOND CONTACT BODY TOWARD LOWER SIDE

↓

RESTART SCROLL PROCESS
(SCROLL DIRECTION IS DOWNWARD DIRECTION,
SCROLL SPEED IS LOWEST SPEED)

DISPLAY INPUT DEVICE, IMAGE FORMING APPARATUS, AND CONTROL METHOD FOR DISPLAY INPUT DEVICE

INCORPORATION BY REFERENCE

This application is based upon and claims the benefit of priority from the corresponding Japanese Patent Application No. 2018-119101 filed Jun. 22, 2018, the entire contents of which are hereby incorporated by reference.

BACKGROUND

The present disclosure relates to a display input device, an image forming apparatus, and a control method for a display input device.

A display input device provided to an image forming apparatus or the like displays various screens. Some screens displayed on the display input device enable scrolling of display content.

A conventional display input device has a touch screen. In the conventional display input device, when the touch screen receives a scroll operation, scroll processing is started to scroll display content on the screen.

For instance, the conventional display input device sets a scroll speed based on pressing force of a contact body (such as a user's finger or a touch pen) against the touch screen when the scroll operation starts. As the pressing force of the contact body is larger, the scroll speed is slower.

SUMMARY

A display input device according to a first aspect of the present disclosure includes a touch screen and a control unit. When the control unit determines that a predetermined scroll operation is performed on the touch screen while the touch screen displays a screen, the control unit controls the touch screen to start scroll processing to scroll display content on the screen to one side or the other side in a predetermined direction. When the control unit determines that an adjust operation is performed on the touch screen in which a contact body is moved while keeping contact with the touch screen after the control unit controls the touch screen to start the scroll processing, the control unit changes scroll speed of the scroll processing by the touch screen in accordance with a contact position of the contact body performing the adjust operation on the touch screen.

An image forming apparatus according to a second aspect of the present disclosure includes the display input device described above.

A control method for the display input device according to a third aspect of the present disclosure is a method for controlling a display input device equipped with a touch screen. The method comprises the steps of determining that a predetermined scroll operation is performed on the touch screen while the touch screen displays a screen, and then controlling the touch screen to start scroll processing to scroll display content on the screen to one side or the other side in a predetermined direction; and determining that an adjust operation is performed on the touch screen in which a contact body is moved while keeping contact with the touch screen after the touch screen starts the scroll processing, and then changing scroll speed of the scroll processing by the touch screen in accordance with a contact position of the contact body performing the adjust operation on the touch screen.

DETAILED DESCRIPTION

<Structure of Image Forming Apparatus>

Figure 1:
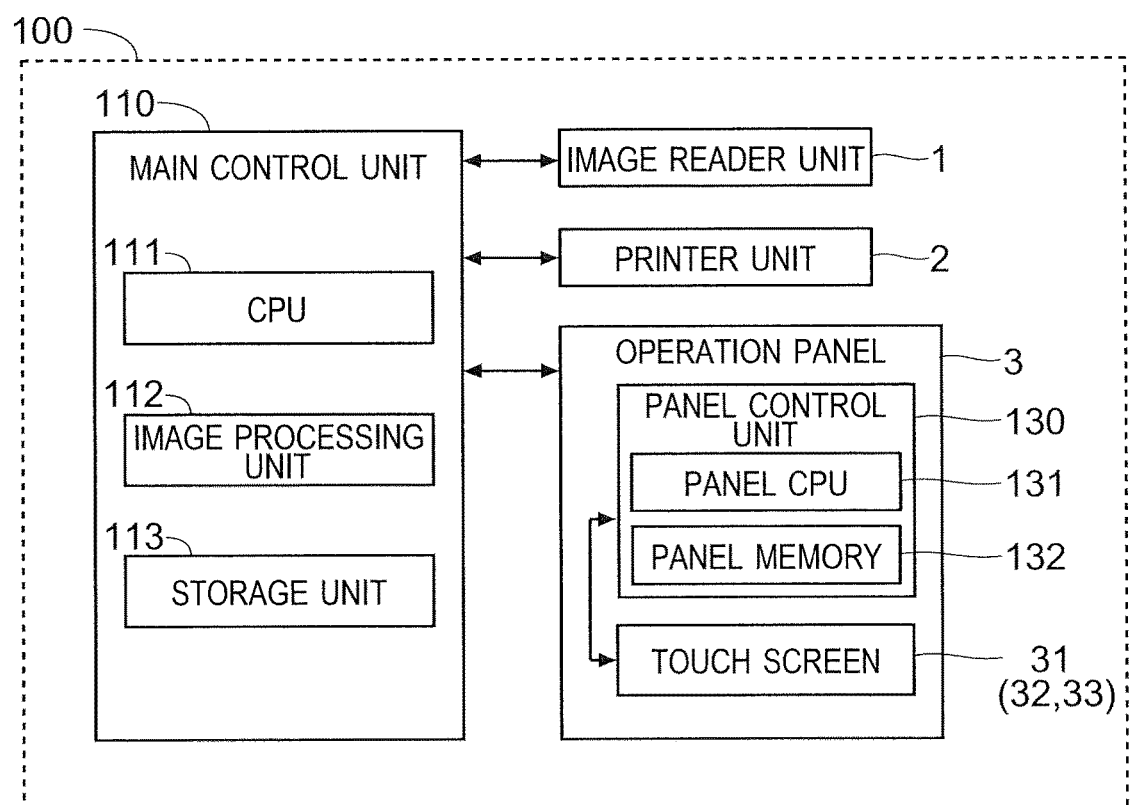
FIG. 1 is a diagram illustrating a structure of an image forming apparatus equipped with an operation panel according to one embodiment of the present disclosure.

As illustrated in FIG. 1, an image forming apparatus 100 of this embodiment includes an image reader unit 1 and a printer unit 2. The image reader unit 1 reads a document and generates image data of the document. The printer unit 2 prints an image on a paper sheet based on image data (e.g. the image data of the document obtained when the image reader unit 1 reads the document).

Figure 2:
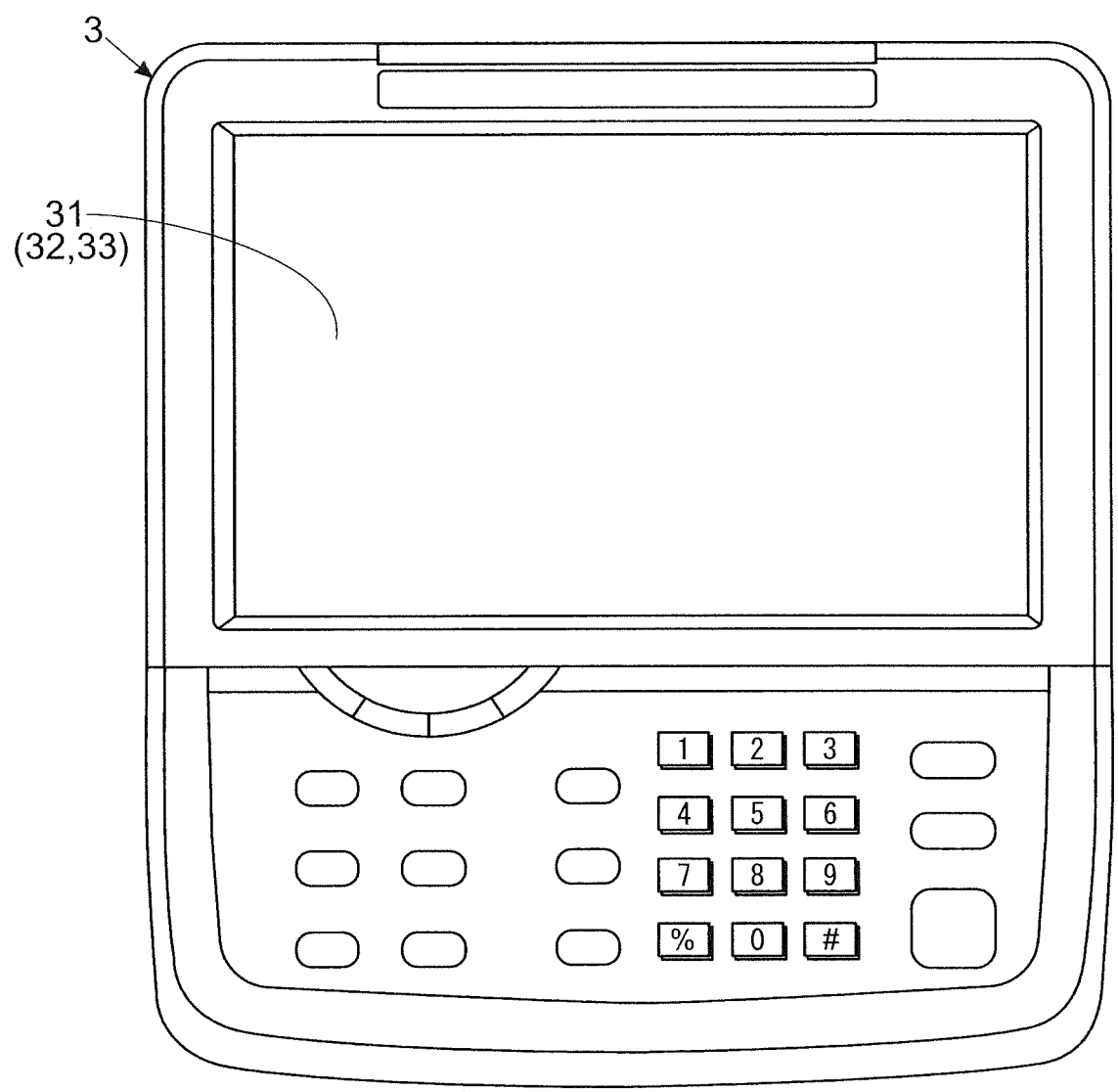
FIG. 2 is a diagram illustrating a structure of the operation panel according to one embodiment of the present disclosure.

In addition, the image forming apparatus 100 includes an operation panel 3 as illustrated in FIG. 2. The operation panel 3 corresponds to a "display input device".

The operation panel 3 is equipped with a touch screen 31. The touch screen 31 includes a display panel 32 and a touch panel 33. The display panel 32 may be a liquid crystal display panel or may be an organic EL display panel. The touch panel 33 is disposed on a surface of the display panel 32.

The touch screen 31 displays various screens on the display panel 32. Further, the touch screen 31 receives an operation from a user via the touch panel 33. When performing an operation to the touch screen 31, the user allows a contact body to contact the touch screen 31. In other words, the user performs a touch operation (an operation to allow the contact body to contact the touch screen 31). A user's finger, a touch pen, or the like can be the contact body.

The touch operation may be an operation to promptly move the contact body on the touch screen 31 off the touch screen 31 (hereinafter this operation may be referred to as a tap operation), an operation to swiftly move the contact body on the touch screen 31 while keeping contact between the contact body and the touch screen 31 and move the same off the touch screen 31 (hereinafter this operation may be referred to as a flick operation), an operation to move the contact body on the touch screen 31 while keeping contact between the contact body and the touch screen 31 (hereinafter this operation may be referred to as a slide operation), or the like. These touch operations are examples, and the touch screen 31 receives other various touch operations from the user.

With reference to FIG. 1 again, the image forming apparatus 100 includes a main control unit 110. The main control unit 110 includes a CPU 111, an image processing unit 112, and a storage unit 113. The image processing unit 112 performs various types of image processing on the image data. The storage unit 113 stores a program to control operations of individual units of the image forming apparatus 100, a program to control the image processing, and data necessary for various types of control. The main control unit 110 controls operations of the image reader unit 1 and the printer unit 2, and performs image processing on the image data, based on the programs and data stored in the storage unit 113.

The operation panel 3 is equipped with a panel control unit 130. The panel control unit 130 corresponds to a "control unit". The panel control unit 130 includes a panel CPU 131 and a panel memory 132 (a ROM and a RAM). the panel memory 132 stores a display program to allow the touch screen 31 to display screens, screen data of the screens to be displayed on the touch screen 31.

The panel control unit 130 is connected to the main control unit 110. The panel control unit 130 receives an instruction from the main control unit 110 and controls display operation of the touch screen 31. In addition, the panel control unit 130 performs detection of contact position of the contact body on the touch screen 31, detection of movement locus of the contact position, detection of contact time of the contact body (time from contact of the contact body with the touch screen 31 to separation of the contact body from the touch screen 31), and the like, based on a voltage signal output from the touch screen 31 when the contact body contacts the touch screen 31. On the basis of the detection result, the panel control unit 130 determines which touch operation is performed to the touch screen 31, and transmits to the main control unit 110 an operation signal indicating the touch operation performed to the touch screen 31.

<Scroll Processing>

Figure 3:
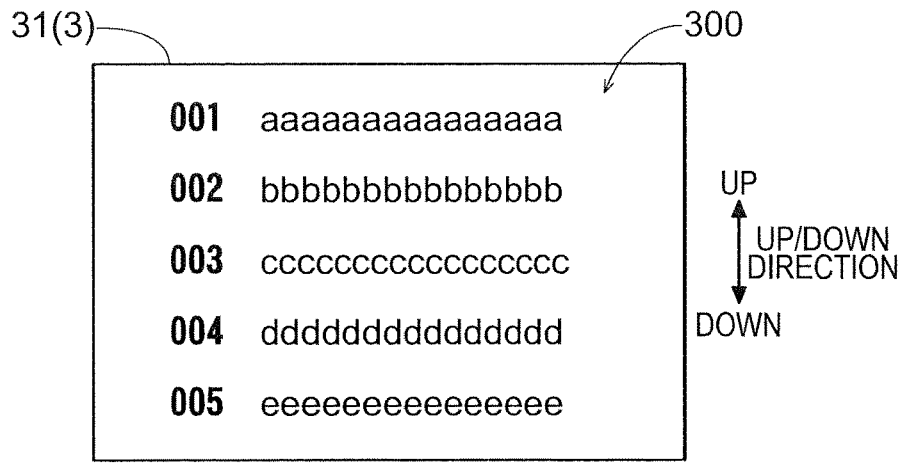
FIG. 3 is a diagram illustrating an address book screen displayed by the operation panel according to one embodiment of the present disclosure.

The touch screen 31 displays a scrollable screen capable of scrolling display content. When the touch screen 31 displays the scrollable screen, it receives a predetermined scroll operation from a user. The touch screen 31 can display a plurality of scrollable screens. In the following description, out of the plurality of scrollable screens, an address book screen 300 as illustrated in FIG. 3 is exemplified, and scroll processing performed by the touch screen 31 is described.

The address book screen 300 displays a list of addresses registered by the user in advance, as choices. In FIG. 3, an address is shown as a string of alphabet characters. When the address book screen 300 is displayed, the panel control unit 130 allows the touch screen 31 to receive an address selection operation to select one of the addresses displayed on the address book screen 300. The touch screen 31 receives from the user a tap operation to a display region of one of the addresses displayed on the address book screen 300, as the address selection operation.

When the panel control unit 130 determines that the address selection operation is performed to the touch screen 31, it informs the main control unit 110 of the address selected in the address selection operation. The main control unit 110 sets the address informed from the panel control unit 130 to a data destination, and sends (stores) the data to the set data destination. For instance, an address of a storage device disposed in the image forming apparatus 100 or connected to the same, an address of an external device connected to the image forming apparatus 100 in a communicable manner, or the like can be the data destination. In addition, image data obtained by reading with the image reader unit 1 can be an object to be transmitted.

Further, the address book screen 300 displays only a predetermined number of addresses out of a plurality of addresses. In order to display other addresses on the address book screen 300, it is necessary to scroll the display content (address list) of the address book screen 300. The address book screen 300 is a scrollable screen, and hence the display content of the address book screen 300 can be scrolled.

When the address book screen 300 is displayed, the panel control unit 130 determines whether or not the scroll operation is performed to the touch screen 31. When the panel control unit 130 determines that the scroll operation is performed to the touch screen 31, it issues a scroll instruction to the touch screen 31. When the touch screen 31 receives the scroll instruction from the panel control unit 130, it performs the scroll processing to scroll the display content (address list) of the address book screen 300. In this way, the display content of the address book screen 300 is scrolled to one side or the other side opposite to the one side in a predetermined direction.

Note that the up/down direction of the screen (direction of arrangement of addresses) is the predetermined direction in the address book screen 300. The address list can be scrolled in an upward direction (a direction toward one side in the predetermined direction), or the address list can be scrolled in a downward direction (a direction toward the other side opposite to the one side in a predetermined direction).

When the panel control unit 130 detects a flick operation to the touch screen 31 during display of the address book screen 300, it determines that the scroll operation is performed to the touch screen 31. In this case, the panel control unit 130 recognizes a movement direction of the flick operation detected as the scroll operation (a movement direction of the contact body after the contact body contacts the touch screen 31). Then, the panel control unit 130 sets a scroll direction based on the movement direction of the flick operation as the scroll operation, and controls the touch screen 31 to start the scroll processing so that the display content of the address book screen 300 is scrolled in the set scroll direction.

Figure 4:
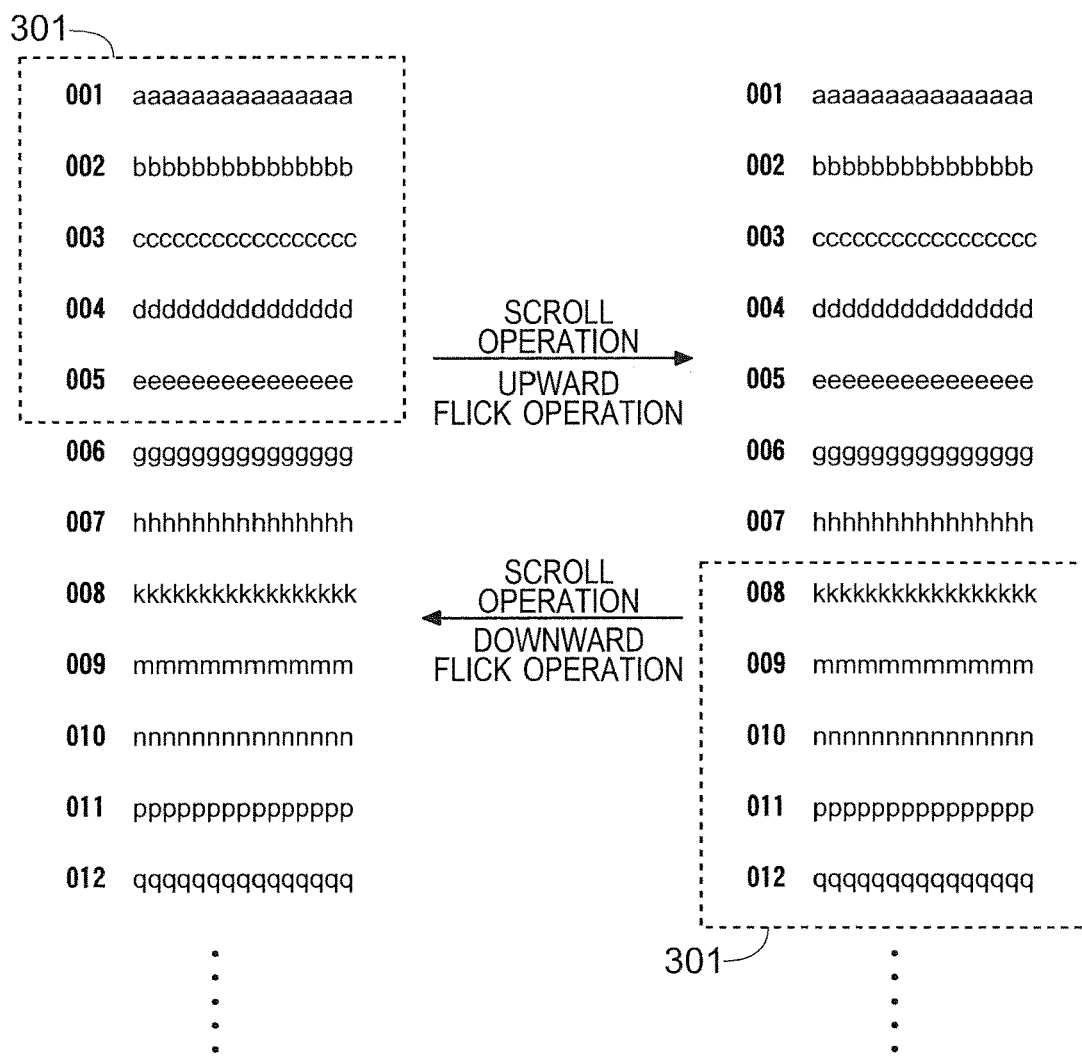
FIG. 4 is a diagram to explain scroll processing performed by the operation panel according to one embodiment of the present disclosure.

It is supposed that there is an address list illustrated in FIG. 4 as an example. In the example illustrated in FIG. 4, when a certain range of the address list is displayed on the address book screen 300, another range of the address list cannot be displayed on the address book screen 300. In order to display another range of the address list on the address book screen 300, it is necessary to scroll the display content (address list) of the address book screen 300. In FIG. 4, displayed ranges of the address list are surrounded by broken lines and are referred to as a display range 301.

In the state illustrated in the left of FIG. 4, it is supposed that the user performs an upward flick operation (an operation to scroll the address list in the upward direction), i.e. an operation to swiftly move the contact body on the touch screen 31 in the upward direction while keeping contact between the contact body and the touch screen 31 and move the same off the touch screen 31.

When detecting that the upward flick operation is performed to the touch screen 31, the panel control unit 130 determines that the scroll operation is performed. In this case, the panel control unit 130 sets the scroll direction to the upward direction. Then, the panel control unit 130 controls the touch screen 31 to perform the scroll processing to scroll the address list in the upward direction (to move the display range 301 in the downward direction). In this way, the state illustrated in the left of FIG. 4 can be changed to the state illustrated in the right of FIG. 4. The user can see that the address list is scrolled in the upward direction.

In addition, in the state illustrated in the right of FIG. 4, it is supposed that the user performs a downward flick operation (an operation to scroll the address list in the downward direction), i.e. an operation to swiftly move the contact body on the touch screen 31 in the downward direction while keeping contact between the contact body and the touch screen 31 and move the same off the touch screen 31.

When detecting that the downward flick operation is performed to the touch screen 31, the panel control unit 130 determines that the scroll operation is performed. In this case, the panel control unit 130 sets the scroll direction to the downward direction. Then, the panel control unit 130 controls the touch screen 31 to perform the scroll processing to scroll the address list in the downward direction (to move the display range 301 in the upward direction). In this way, the state illustrated in the right of FIG. 4 can be changed to the state illustrated in the left of FIG. 4. The user can see that the address list is scrolled in the downward direction.

After the panel control unit 130 controls the touch screen 31 to start the scroll processing, it controls the same to gradually decrease the scroll speed and finally stop the scroll processing. In other words, the panel control unit 130 controls the touch screen 31 to perform inertia scroll processing.

After starting the scroll processing (during execution of the scroll processing), the touch screen 31 receives an adjust operation from a user. When the panel control unit 130 determines that the adjust operation is performed to the touch screen 31, it performs a changing process to change the scroll speed of the scroll processing by the touch screen 31. By performing the adjust operation, the scroll direction of the scroll processing by the touch screen 31 can also be changed.

In order to perform the adjust operation, it is necessary to allow two contact bodies to simultaneously contact the touch screen 31 during the display of the address book screen 300. After allowing the two contact bodies to contact the touch screen 31, one of the contact bodies is used to perform the scroll operation (flick operation), and the other contact body is maintained to contact the touch screen 31 at this time point. Then, afterwards the adjust operation can performed with the other contact body.

With reference to FIGS. 5 to 10, the adjust operation (including the scroll operation) is specifically described below. In FIGS. 5 to 10, contact positions of the contact bodies on the touch screen 31 are shown by white circles, and a movement direction of the contact position is shown by a white arrow. In addition, in order to discriminate between contact positions before and after movement, a contact position before movement is shown by a broken line, and a contact position after movement is shown by a solid line. In addition, for easy viewing of the diagram, addresses are not shown in FIGS. 5 to 10.

Figure 5:
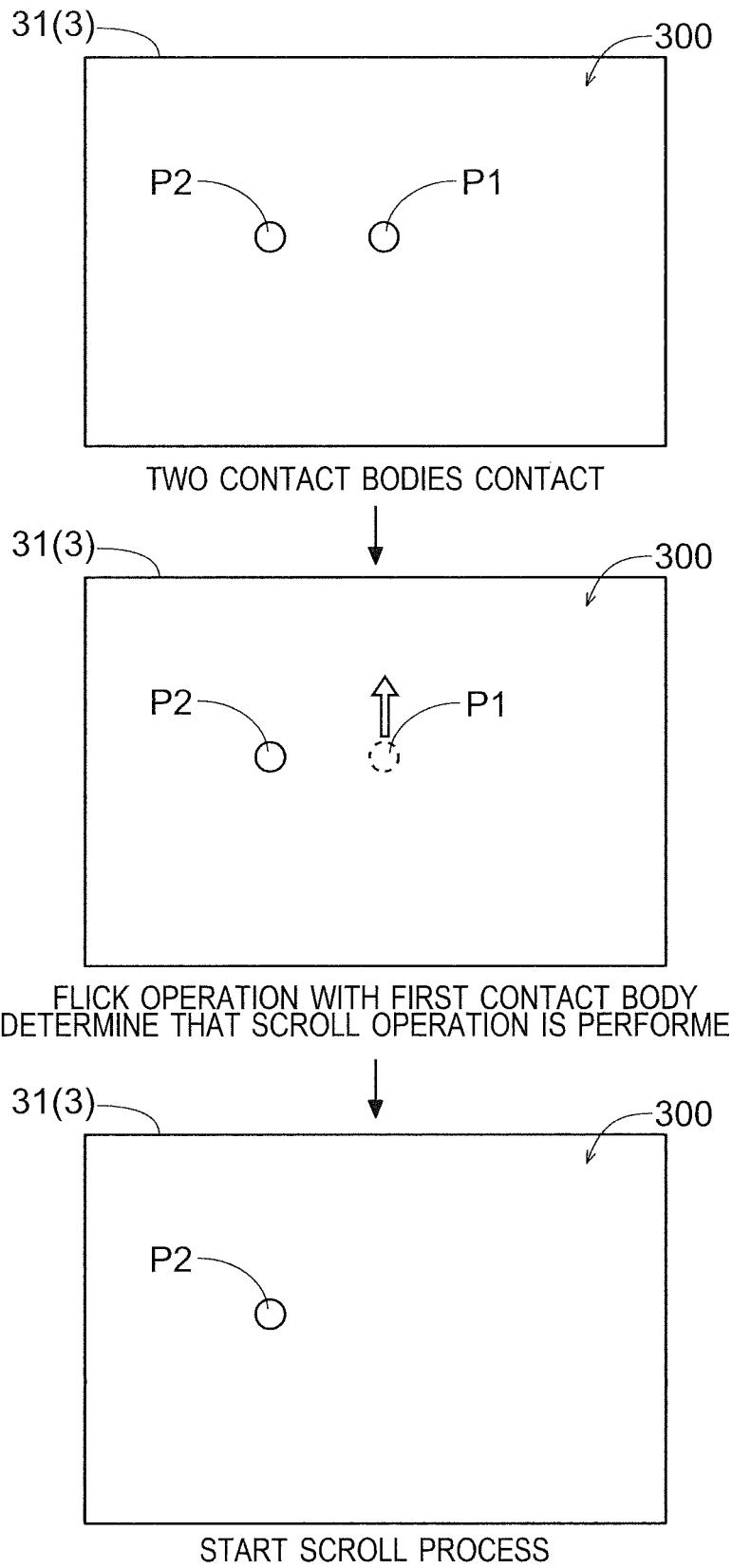
FIG. 5 is a diagram to explain a scroll operation performed to the operation panel according to one embodiment of the present disclosure.

First, as shown in the upper of FIG. 5, it is supposed that two contact bodies contact the touch screen 31 during display of the address book screen 300. For instance, when a user touches the touch screen 31 with two fingers at the same time, the state shown in the upper of FIG. 5 appears. In this case, the panel control unit 130 detects that two contact bodies contact the touch screen 31. In the following description, one contact position of one of the contact bodies on the touch screen 31 is denoted by symbol P1, and the other contact position of the other contact body on the touch screen 31 is denoted by symbol P2.

After that, as shown in the middle of FIG. 5, it is supposed that the flick operation is performed with one of the two contact bodies contacting the touch screen 31 (hereinafter referred to as a first contact body). At this time point, the other contact body (hereinafter referred to as a second contact body) maintains contact with the touch screen 31 and is not moved.

In this case, the panel control unit 130 detects that the first contact body has swiftly moved while keeping contact with the touch screen 31 and moves off the touch screen 31. Therefore, the panel control unit 130 determines that the scroll operation (flick operation) is performed to the touch screen 31.

For instance, it is supposed that the direction of the flick operation by the first contact body is the upward direction (the contact position P1 has moved in the upward direction). In this case, the panel control unit 130 sets the scroll direction of the scroll processing to the upward direction and controls the touch screen 31 to start the scroll processing. In this way, scroll of the display content (address list) of the address book screen 300 in the upward direction is started. Although not illustrated, when the direction of the flick operation by the first contact body is the downward direction (when the contact position P1 is moved in the downward direction), the scroll direction of the scroll processing is set to the downward direction.

When the panel control unit 130 determines that the scroll operation is performed to the touch screen 31 (when it controls the touch screen 31 to start the scroll processing), if the second contact body is touched with the touch screen 31, i.e. in the state shown in the lower of FIG. 5, the panel control unit 130 determines whether or not the adjust operation is performed. In contrast, if the second contact body is not touched with the touch screen 31, the panel control unit 130 does not determine whether or not the adjust operation is performed.

After the panel control unit 130 determines that the scroll operation is performed to the touch screen 31, i.e., after the panel control unit 130 controls the touch screen 31 to start the scroll processing, when it detects that the second contact body has moved while keeping contact with the touch screen 31, it determines that the adjust operation is performed to the touch screen 31. When the flick operation is performed with the first contact body, if the second contact body is also moved off the touch screen 31, the adjust operation cannot be performed.

When the panel control unit 130 determines that the adjust operation is performed (the second contact body is moved while keeping contact with the touch screen 31), it recognizes the current contact position P2 of the second contact body on the touch screen 31 (the contact position P2 at the movement destination). Then, the panel control unit 130 performs the changing process to change the scroll speed of the scroll processing by the touch screen 31, in accordance with the contact position P2 of the second contact body on the touch screen 31.

Figure 6:
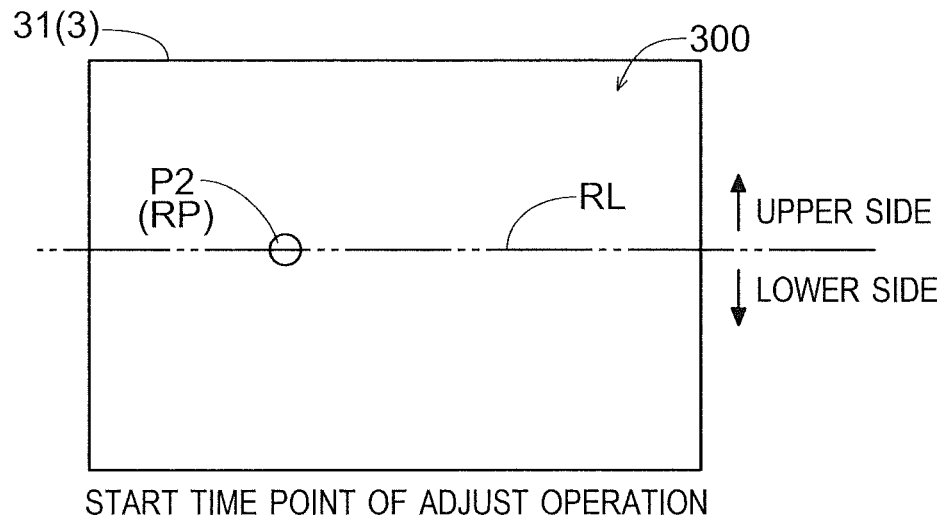
FIG. 6 is a diagram to explain an adjust operation performed to the operation panel according to one embodiment of the present disclosure.

Specifically, as illustrated in FIG. 6, the panel control unit 130 recognizes the contact position P2 of the second contact body on the touch screen 31 at start time point of the adjust operation. In the following description, the contact position P2 of the second contact body on the touch screen 31 at the start time point of the adjust operation is denoted by symbol RP and is referred to as a reference position RP. Further, when the panel control unit 130 performs the changing process, the panel control unit 130 regards a line that passes the reference position RP and is perpendicular to the up/down direction (predetermined direction) as a reference line RL, and determines whether the second contact body (contact position P2) is moved to the upper side (one side) or the lower side (the other side opposite to the one side) of the reference line RL from the reference position RP. Note that the reference line RL may be displayed on the touch screen 31.

Figure 7:
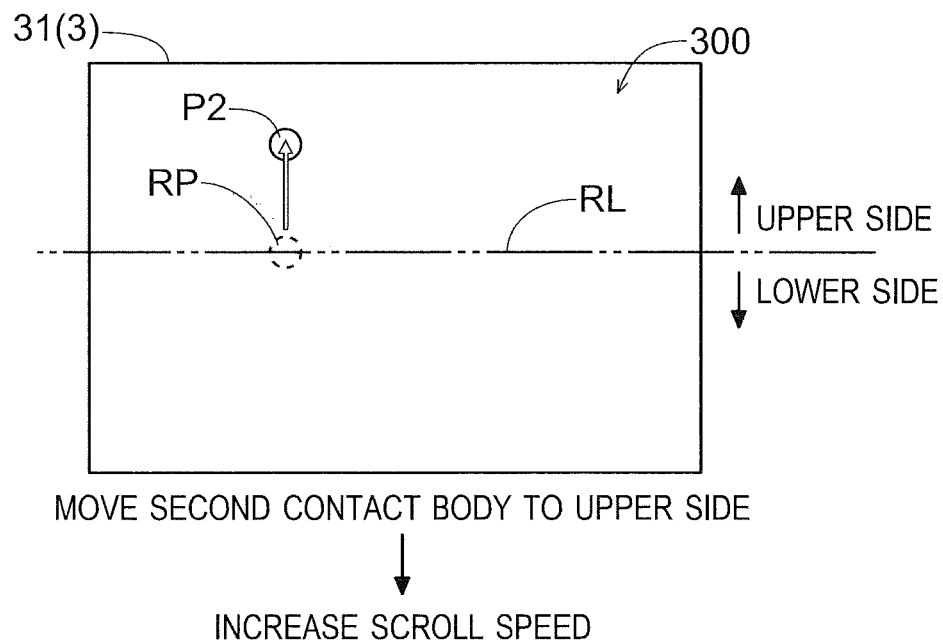
FIG. 7 is a diagram illustrating an operation method when increasing scroll speed of the scroll processing performed by the operation panel according to one embodiment of the present disclosure.

For instance, as illustrated in FIG. 7, it is supposed that the user did the slide operation to move the second contact body to the upper side while keeping contact with the touch screen 31. In this case, the panel control unit 130 determines that the adjust operation is performed. In addition, the panel control unit 130 detects that the second contact body is moved from the reference position RP to the upper side of the reference line RL (the contact position P2 is moved to the upper side of the reference line RL). In this case, the panel control unit 130 increases the scroll speed so that the scroll speed of the scroll processing by the touch screen 31 becomes faster than the current speed (the speed when the second contact body is moved to the upper side of the reference line RL).

Figure 8:
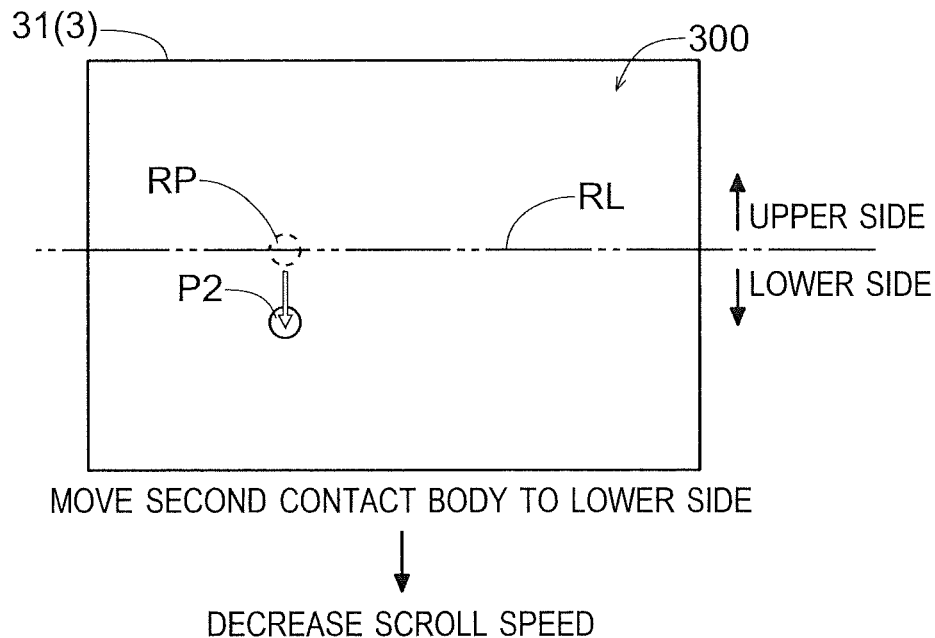
FIG. 8 is a diagram illustrating an operation method when decreasing the scroll speed of the scroll processing performed by the operation panel according to one embodiment of the present disclosure.

In contrast, as illustrated in FIG. 8, it is supposed that the user did the slide operation to move the second contact body to the lower side while keeping contact with the touch screen 31. In this case, the panel control unit 130 determines that the adjust operation is performed. In addition, the panel control unit 130 detects that the second contact body is moved from the reference position RP to the lower side of the reference line RL (the contact position P2 is moved to the lower side of the reference line RL). In this case, the panel control unit 130 reduces the scroll speed so that the scroll speed of the scroll processing by the touch screen 31 becomes slower than the current speed (the speed when the second contact body is moved to the lower side of the reference line RL).

Further, when the adjust operation is performed on the lower side of the reference line RL (when the second contact body contacts the touch screen 31 in the lower side area of the reference line RL), the panel control unit 130 continues the changing process based on the contact position P2. In other words, after the second contact body is moved to the lower side, the adjust operation can be continued unless the second contact body moves off the touch screen 31.

When the adjust operation is performed on the lower side of the reference line RL, the panel control unit 130 recognizes a distance between the contact position P2 and the reference line RL in the up/down direction. Further, when the distance between the contact position P2 and the reference line RL in the up/down direction becomes a predetermined distance, the panel control unit 130 temporarily stops the scroll processing by the touch screen 31.

In addition, when the distance between the contact position P2 and the reference line RL in the up/down direction exceeds the predetermined distance, the panel control unit 130 sets the scroll direction to be opposite to the scroll direction at the start time point of the adjust operation. Further, the panel control unit 130 sets the scroll speed to a predetermined lowest speed. Then, the panel control unit 130 controls the touch screen 31 to restart the scroll processing under the set condition. In other words, the touch screen 31 scrolls the display content (address list) of the address book screen 300 at the lowest speed in the scroll direction opposite to the scroll direction at the start time point of the adjust operation.

Figure 9:
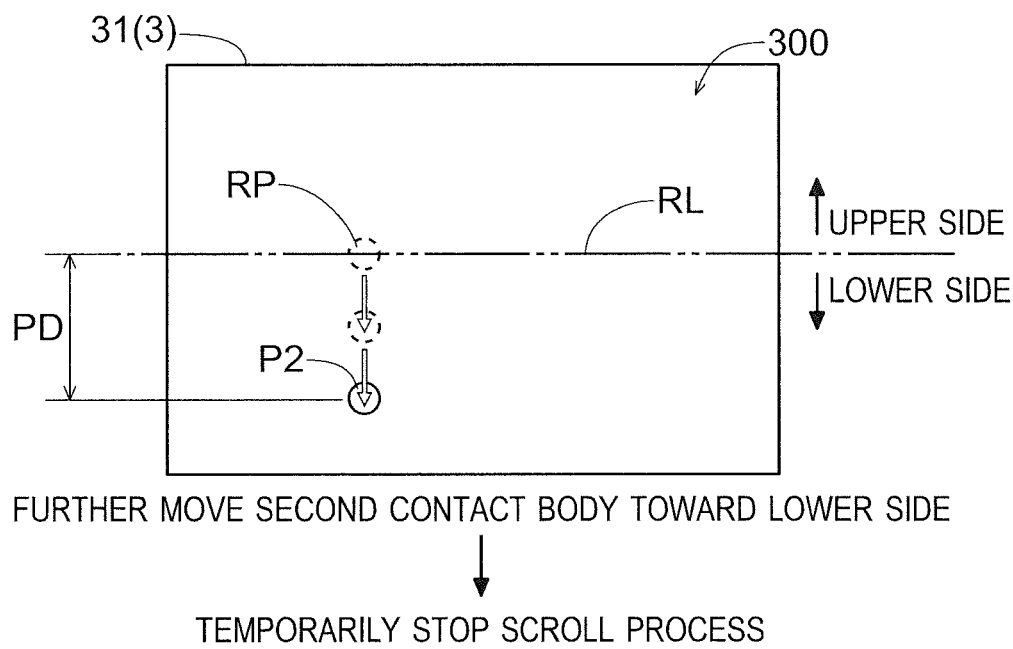
FIG. 9 is a diagram illustrating an operation method when stopping temporarily the scroll processing performed by the operation panel according to one embodiment of the present disclosure.

For instance, it is supposed that the user further moves the second contact body from the state illustrated in FIG. 8 toward the lower side while keeping contact with the touch screen 31. As a result, as illustrated in FIG. 9, it is supposed that the distance between the contact position P2 and the reference line RL in the up/down direction becomes the predetermined distance (denoted by symbol PD in FIG. 9). In this case, the panel control unit 130 controls the touch screen 31 to temporarily stop the scroll processing.

Figure 10:
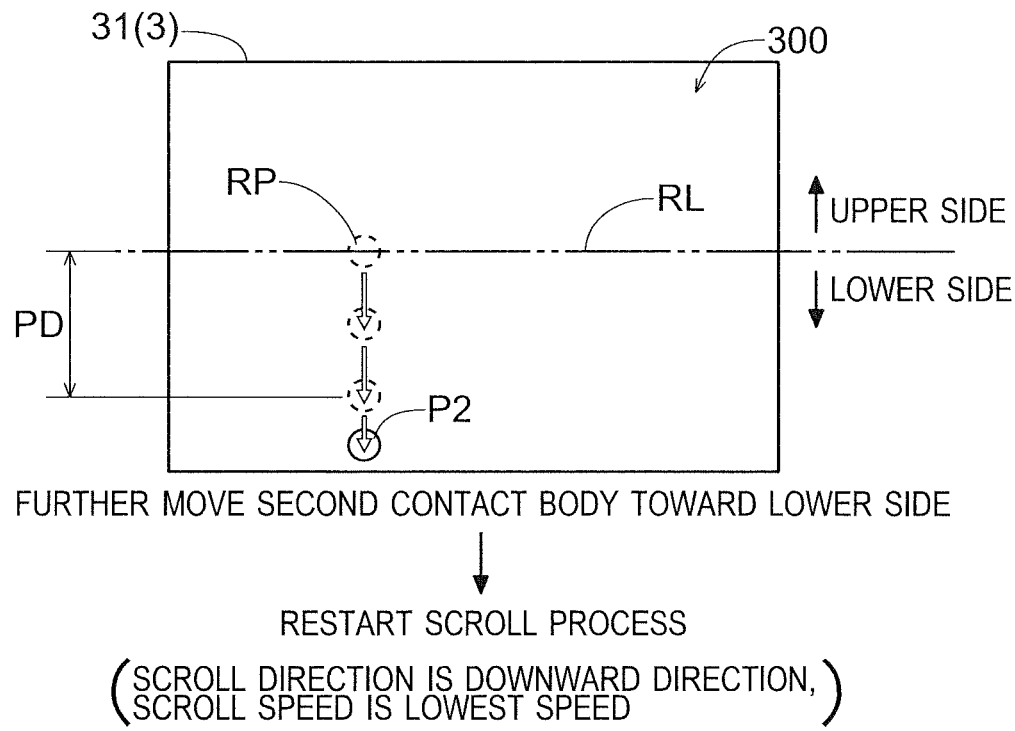
FIG. 10 is a diagram illustrating an operation method when changing scroll direction of the scroll processing to the opposite direction, which is performed by the operation panel according to one embodiment of the present disclosure.

In addition, it is supposed that the user further moves the second contact body from the state illustrated in FIG. 9 toward the lower side while keeping contact with the touch screen 31. As a result, it is supposed that the distance between the contact position P2 and the reference line RL in the up/down direction exceeds the predetermined distance PD as illustrated in FIG. 10. In this case, the panel control unit 130 controls the touch screen 31 to restart the scroll processing. In this case, the scroll speed of the scroll processing becomes the lowest speed. In addition, the scroll direction of the scroll processing in this case is the downward direction. Because the scroll direction at the start time point of the adjust operation is the upward direction.

Note that after controlling the touch screen 31 to start the scroll processing, the panel control unit 130 determines whether or not the second contact body is moved off the touch screen 31. Further, when the second contact body is moved off the touch screen 31, the panel control unit 130 controls the touch screen 31 to stop the scroll processing. Therefore, when the user's desired address is displayed on the address book screen 300, the second contact body is moved off the touch screen 31, so that the state where the user's desired address is displayed on the address book screen 300 can be maintained. In this way, the user's desired address can be selected as the data destination.

The operation panel 3 (display input device) of this embodiment includes the touch screen 31 and the panel control unit 130 (control unit). When the panel control unit 130 determines that the predetermined scroll operation is performed to the touch screen 31 while the touch screen 31 displays the address book screen 300 (screen), it controls the touch screen 31 to start the scroll processing to scroll the display content of the address book screen 300 to the upper side (one side) or the lower side (the other side) in the up/down direction (predetermined direction). After controlling the touch screen 31 to start the scroll processing, when the panel control unit 130 determines that the adjust operation is performed to the touch screen 31, in which the contact body is moved while keeping contact with the touch screen 31, the panel control unit 130 changes the scroll speed of the scroll processing by the touch screen 31 in accordance with the contact position of the contact body performing the adjust operation on the touch screen 31.

In the structure of this embodiment, after the scroll processing is started (during execution of the scroll processing), when the operation to move the contact body while keeping contact between the contact body and the touch screen 31 is performed, this operation is regarded as the adjust operation. In this case, the scroll speed of the scroll processing is changed in accordance with the contact position of the contact body performing the adjust operation on the touch screen 31. In this way, by adjusting the contact position of the contact body performing the adjust operation on the touch screen 31, the scroll speed of the scroll processing can be arbitrarily changed (to be the user's desired speed).

In addition, in this embodiment, as described above, when the panel control unit 130 detects that the first contact body that is one of two contact bodies contacting the touch screen 31 is moved while keeping contact with the touch screen 31 and is moved off the touch screen 31 during display of the address book screen 300, the panel control unit 130 determines that the scroll operation is performed. After determining that the scroll operation is performed, when the panel control unit 130 detects that the second contact body as the other contact body is moved while keeping contact with the touch screen 31, it determines that the adjust operation is performed.

With this structure, only by performing the scroll operation with one of the contact bodies after the two contact bodies contact the touch screen 31, it is possible to afterwards perform the adjust operation with the other contact body. In this way, user's convenience is improved.

In addition, in this embodiment, as described above, after the scroll processing is started (during execution of the scroll processing), when the second contact body is moved to the upper side of the reference line RL, the panel control unit 130 increases the scroll speed so that the scroll speed becomes higher than the current speed. In this way, the user can increase the scroll speed by a simple operation (the operation to move the second contact body to the upper side), and this is convenient.

In common inertia scroll processing, after the scroll processing is started, the scroll speed is gradually decreased, and finally the scroll processing is finished. When the scroll processing is finished, if the display range is out of the user's desired range, it is necessary to perform the scroll operation again. Performing the scroll operation frequently is burdensome for users.

On the other hand, with the structure of this embodiment, when the scroll speed becomes slow (when the scroll processing is going to finish), the scroll speed can be increased by moving the second contact body to the upper side of the reference line RL. In other words, end timing of the scroll processing can be delayed. In this way, it is not necessary to perform the scroll operation frequently.

In addition, in this embodiment, as described above, when the second contact body is moved to the lower side of the reference line RL after the scroll processing is started (during execution of the scroll processing), the panel control unit 130 decreases the scroll speed so that the scroll speed becomes slower than the current speed. In this way, the user can decrease the scroll speed by a simple operation (the operation to move the second contact body to the lower side), and hence this is convenient. For instance, the scroll speed can be decreased when the display range approaches the user's desired range, and hence it is easy to adjust the display range to the user's desired range.

In addition, in this embodiment, as described above, while the adjust operation is being performed on the lower side of the reference line RL, the panel control unit 130 temporarily stops the scroll processing when the distance between the contact position P2 and the reference line RL in the up/down direction becomes the predetermined distance PD. Although the scroll processing can be stopped also by moving the second contact body off the touch screen 31, the scroll processing is finished in this case, and hence the adjust operation cannot be performed afterwards. In contrast, if the second contact body is moved until the distance between the contact position P2 and the reference line RL in the up/down direction becomes the predetermined distance PD, the scroll processing can be stopped while keeping contact between the second contact body and the touch screen 31, and hence the adjust operation can be continued afterwards (the scroll processing can be restarted, and the scroll speed and the scroll direction of the scroll processing after the restart can be changed).

In addition, in this embodiment, as described above, in the case where the adjust operation is being performed on the lower side of the reference line RL, when the distance between the contact position P2 and the reference line RL in the up/down direction exceeds the predetermined distance PD, the panel control unit 130 changes the scroll direction to be opposite to the scroll direction at the start time point of the adjust operation. In this way, the scroll direction can be reversed by a simple operation (only by moving the second contact body until the distance between the contact position P2 and the reference line RL in the up/down direction exceeds the predetermined distance). In other words, it is not necessary to perform the scroll operation again for reversing the scroll direction.

In addition, in this embodiment, as described above, when the panel control unit 130 changes the scroll direction to be opposite to the scroll direction at the start time point of the adjust operation, it changes the scroll speed to the predetermined lowest speed. For instance, if the display range unintentionally exceeds the user's desired range, the user reverses the scroll direction. In this case, if the scroll speed is the lowest speed, fine adjustment of the display range can be easily performed. Therefore, when reversing the scroll direction, it is preferred to set the scroll speed to the lowest speed.

<Variations>

In a variation, the adjust operation can be performed without letting two contact bodies contact the touch screen 31 at the same time. Specific description is as follows.

When the panel control unit 130 determines that the scroll operation is performed to the touch screen 31 during display of the address book screen 300, it controls the touch screen 31 to start the scroll processing. In this case, the user does not need to contact the touch screen 31 with two contact bodies. In other words, the user can contact the touch screen 31 with only one contact body and can perform the flick operation with the contacted contact body.

Figure 11:
FIG. 11 is a diagram to explain the adjust operation according to a variation of the present disclosure (a diagram of a state in which a predetermined image is displayed on the address book screen)

When controlling the touch screen 31 to start the scroll processing, the panel control unit 130 controls the touch screen 31 to display a predetermined image PG as illustrated in FIG. 11. The pattern, color, shape, and size of the predetermined image PG are not particularly limited. In addition, the display position of the predetermined image PG is also not particularly limited.

After the predetermined image PG is displayed, when the panel control unit 130 detects that the contact body contacts a display region of the predetermined image PG and then the contacted contact body moves while keeping contact with the touch screen 31, it determines that the adjust operation is performed to the touch screen 31. Note that the predetermined image PG moves following the contact body.

When the panel control unit 130 determines that the adjust operation is performed, it recognizes the current contact position of the contact body on the touch screen 31 (the contact position at the movement destination). Further, in accordance with the contact position of the contact body on the touch screen 31, the panel control unit 130 performs the changing process to change the scroll speed of the scroll processing by the touch screen 31. By performing the adjust operation, the scroll direction of the scroll processing by the touch screen 31 can also be changed.

In the variation, the changing process similar to that in the embodiment described above is performed. In other words, the panel control unit 130 regards the contact position of the contact body on the touch screen 31 at the start time point of the adjust operation (when the contact body contacts the display region of the predetermined image PG) (position within the display region of the predetermined image PG) as the reference position, and regards the line that passes the reference position and is perpendicular to the up/down direction (predetermined direction) as the reference line.

Then, the panel control unit 130 changes the scroll speed of the scroll processing based on whether the contact body moves to the upper side or the lower side of the reference line. If the contact body moves to the upper side of the reference line, the panel control unit 130 increases the scroll speed. If the contact body moves to the lower side of the reference line, the panel control unit 130 decreases the scroll speed.

In addition, when the distance between the contact position of the contact body and the reference line in the up/down direction becomes a predetermined distance, the panel control unit 130 temporarily stops the scroll processing. When the distance between the contact position of the contact body and the reference line in the up/down direction exceeds the predetermined distance, the panel control unit 130 restarts the scroll processing. When restarting the scroll processing, the panel control unit 130 sets the scroll direction to the scroll direction opposite to that at the start time point of the adjust operation, and sets the scroll speed to the predetermined lowest speed.

The embodiment and the variation described above are merely examples in all aspects and should not be interpreted as limitations. The scope of the present disclosure is defined not by the above description of the embodiment and the variation but by the claims, and should be understood to include all modifications within the meaning and scope equivalent to the claims.

For instance, the embodiment and the variation described above refer to an example in which the present disclosure is applied to the operation panel provided to the image forming apparatus, but the present disclosure is not limited to this. The present disclosure can be also applied to an operation panel disposed in other apparatuses, and the present disclosure can be also applied to a smart phone, a tablet computer, or the like.

In addition, the embodiment and the variation described above refer to a case where the display content (address list) of the address book screen 300 is scrolled, but the present disclosure is not limited to this. The present disclosure can also be applied to a case where display content of other scrollable screen is scrolled.

In addition, the embodiment and the variation described above refer to an example of the scrollable screen that can be scrolled in the up/down direction, but the present disclosure is not limited to this. The present disclosure can also be applied to a scrollable screen that can be scrolled in a right and left direction.

What is claimed is:

1. A display input device comprising:
a touch screen; and
a control unit arranged to determine that a predetermined scroll operation is performed to the touch screen while the touch screen displays a screen, and then control the touch screen to start scroll processing to scroll display content on the screen to one side or the other side in a predetermined direction, wherein
after the control unit controls the touch screen to start the scroll processing, when the control unit determines that an adjust operation is performed on the touch screen in which a contact body is moved while keeping contact with the touch screen, the control unit changes scroll speed of the scroll processing by the touch screen in accordance with a contact position of the contact body performing the adjust operation on the touch screen,
when, during display of the screen, the control unit detects that, after a first contact body and a second contact body as the contact body simultaneously contact the touch screen, the first contact body moves while keeping contact with the touch screen and then moves off the touch screen, the control unit determines that the scroll operation is performed, and
when the control unit determines that the scroll operation was performed while the second contact body was keeping contact with the touch screen and in addition the control unit detects that the second contact body that was keeping contact with the touch screen when the control unit determined that the scroll operation was performed has moved while keeping contact with the touch screen, the control unit determines that the adjust operation is performed.

2. The display input device according to claim 1, wherein the control unit recognizes a reference line as a line that passes the contact position at start time point of the adjust operation and is perpendicular to the predetermined direction, and when the second contact body moves to one side of the reference line in the predetermined direction, the control unit increases the scroll speed to be faster than current speed.

3. The display input device according to claim 2, wherein when the second contact body moves to the other side opposite to the one side of the reference line, the control unit decreases the scroll speed to be slower than the current speed.

4. The display input device according to claim 3, wherein in a case where the adjust operation is being performed on the other side of the reference line, when a distance between the contact position and the reference line in the predetermined direction becomes a predetermined distance, the control unit temporarily stops the scroll processing.

5. The display input device according to claim 4, wherein in the case where the adjust operation is being performed on the other side of the reference line, when the distance between the contact position and the reference line in the predetermined direction exceeds the predetermined distance, the control unit changes a scroll direction of the scroll processing by the touch screen to be opposite to a scroll direction at the start time point of the adjust operation.

6. The display input device according to claim 5, wherein when the control unit changes the scroll direction to be opposite to the scroll direction at the start time point of the adjust operation, the control unit changes the scroll speed to a predetermined lowest speed.

7. The display input device according to claim 1, wherein the touch screen displays a predetermined image when starting the scroll processing, and when the control unit detects that the contact body contacts a display region of the predetermined image and the contacted contact body moves while keeping contact with the touch screen, the control unit determines that the adjust operation is performed.

8. An image forming apparatus comprising the display input device according to claim 1.

9. A control method for a display input device equipped with a touch screen, the method comprising the steps of:

determining that a predetermined scroll operation is performed on the touch screen while the touch screen displays a screen when it is detected that, after a first contact body and a second contact body simultaneously contact the touch screen, the first contact body moves while keeping contact with the touch screen and then moves off the touch screen, and then controlling the touch screen to start scroll processing to scroll display content on the screen to one side or the other side in a predetermined direction; and determining that an adjust operation is performed on the touch screen with the second contact body when it is determined that the scroll operation was performed while the second contact body was keeping contact with the touch screen and in addition it is detected that the second contact body that was keeping contact with the touch screen when it was determined that the scroll operation was performed has moved while keeping contact with the touch screen, and then changing scroll speed of the scroll processing by the touch screen in accordance with a contact position of the second contact body performing, the adjust operation on the touch screen.

* * * * *